United States Patent [19]

Jarrard

[11] 4,452,151
[45] Jun. 5, 1984

[54] TRUNK LID FOLDING TABLE

[76] Inventor: George A. Jarrard, 106 Sandy Creek Ct., Greer, S.C. 29651

[21] Appl. No.: 328,830

[22] Filed: Dec. 9, 1981

[51] Int. Cl.³ .............................................. A47B 37/00
[52] U.S. Cl. ........................................ 108/44; 108/42; 296/26
[58] Field of Search ........................ 108/44, 48, 47, 42; 296/26, 76

[56] References Cited

U.S. PATENT DOCUMENTS

| | | | |
|---|---|---|---|
| 2,160,958 | 6/1939 | Critchlow | 108/44 |
| 2,451,275 | 10/1948 | Cercownay | 296/26 |
| 2,471,730 | 5/1949 | Doerr | 108/44 |
| 2,721,777 | 10/1955 | Willis | 108/44 |
| 2,833,608 | 5/1958 | Tobias | 108/44 |
| 3,338,620 | 8/1967 | Lauvin | 108/44 |
| 3,709,159 | 1/1973 | Oglesby, Jr. | 108/44 |
| 3,726,422 | 4/1973 | Zelin | 296/26 |
| 3,896,742 | 7/1975 | Ferraro | 108/44 |
| 4,236,461 | 12/1980 | Barksdale | 108/44 |

Primary Examiner—James T. McCall
Assistant Examiner—Mark W. Binder

[57] ABSTRACT

A folding table and carrying support for use in an automobile. The table is carried on the underside of the trunk lid and is supported on guide rollers which fit within channel members secured to the bottom of the trunk lid. The table can be either set up within the trunk by leaving the front guide rollers within the forward channel members or can be completely removed from the vehicle wherein one end of the table is supported on the edge of the trunk and the other end is supported on the foldable legs.

1 Claim, 5 Drawing Figures

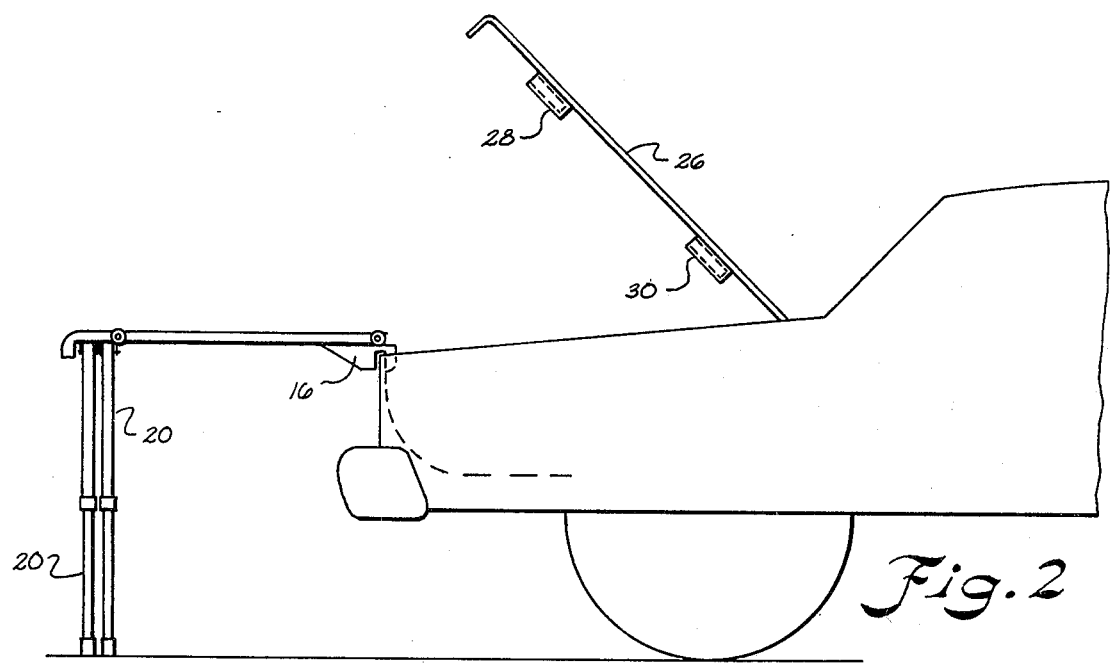
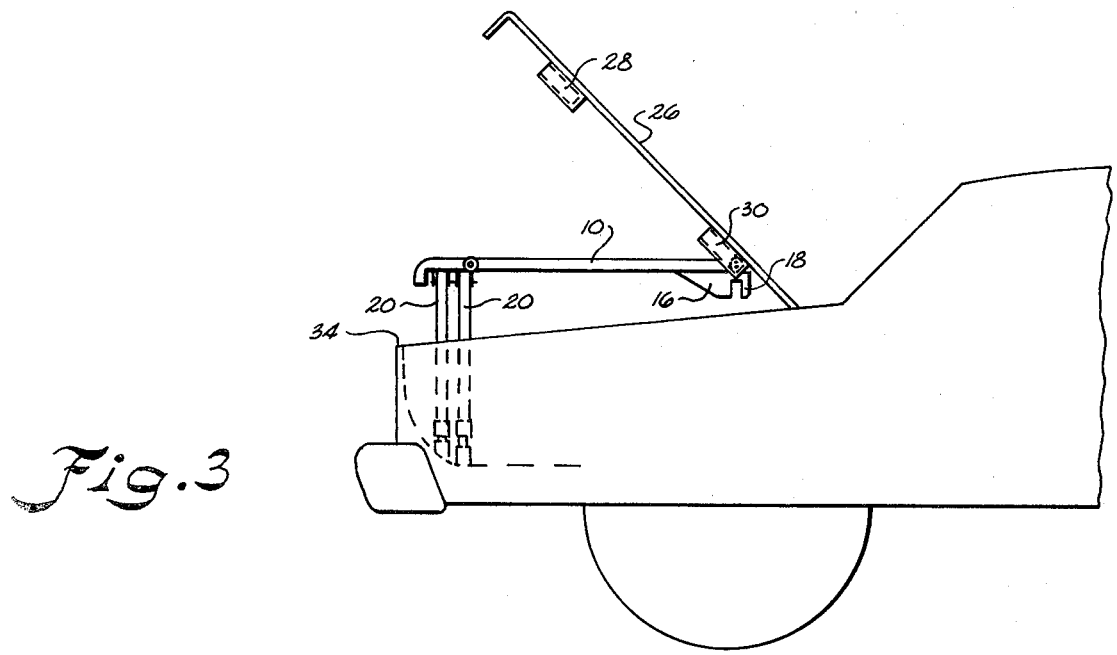
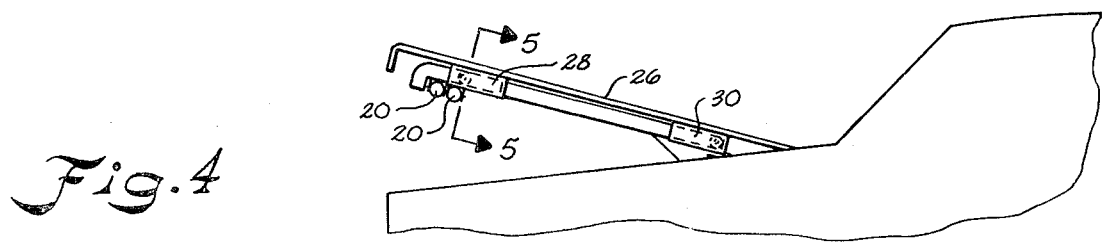

TRUNK LID FOLDING TABLE

BACKGROUND OF THE INVENTION

Heretofore, the majority of people picnicing at football games and other outdoor activities normally carry their supplies in the trunk of a vehicle, and if they desire to have a table, such as a card table, for setting up the supplies they have to place the table in the bottom of the trunk with the supplies thereon. This requires the supplies to be first placed on the ground before setting up the card table. If the supplies are first placed in the trunk and the table positioned thereon, it becomes difficult to close the trunk lid and oftentimes, the supplies are damaged.

Attempts have been made to provide means for securing tables within automobile trunks, however, these attempts normally consume valuable storage space within the trunk. Examples of such tables are shown in U.S. Pat. Nos. 2,471,730, 3,338,620, 3,709,159, 3,473,680 and 3,394,666.

Accordingly, it is an important object of the present invention to provide a table and carrying support therefor wherein the table can be readily secured to the underside of the trunk lid.

Still another important object of the present invention is to provide a folding table and carrying supports therefor wherein the table can either be set up outside of the vehicle or when inclement weather positioned in the trunk of the vehicle.

SUMMARY OF THE INVENTION

In accordance with the present invention, there is provided a folding table and carrying supports therefor for use in an automobile having a trunk lid which extends over the compartment. The trunk lid is usually secured by hinges adjacent an inner end thereof for providing access to the compartment. A pair of spaced guide tracks are secured to the underside of the trunk lid for receiving guide rollers that project outwardly from the side of the table. A pair of foldable legs are carried adjacent the outer end of the flat surface table. A recessed supporting block is carried below and adjacent an inner end of the flat surface of the table for nesting on the edge of the trunk compartment for supporting one end of the table. Each of the guide tracks include a pair of spaced channel members. When it is desired to secure the table on the trunk lid, the guide rollers fit within the pairs of opposed guide tracks. The table can be set up in either of two ways. When it is desired to set the table up completely outside the vehicle, the recess members are positioned over the edge of the trunk of the car and foldable legs support the other end of the table on the ground.

In inclement weather, if it is desired to set the table up within the trunk, the guide rollers adjacent the forward end of the table are left nested in the channel guide tracks and the length of the legs are shortened so they will rest on the floor of the trunk compartment.

Other objects and advantages of the invention will become apparent upon reference to the following attendant claims and drawings.

BRIEF DESCRIPTION OF THE DRAWINGS

FIG. 2 is a side elevational view illustrating the table being supported on the edge of the trunk of the car.

FIG. 3 is a side perspective view illustrating the table set up within the trunk of the car.

FIG. 4 is a side elevational view showing the table positioned on the underside of the lid of the trunk.

DESCRIPTION OF THE PREFERRED EMBODIMENT

Figure 1:
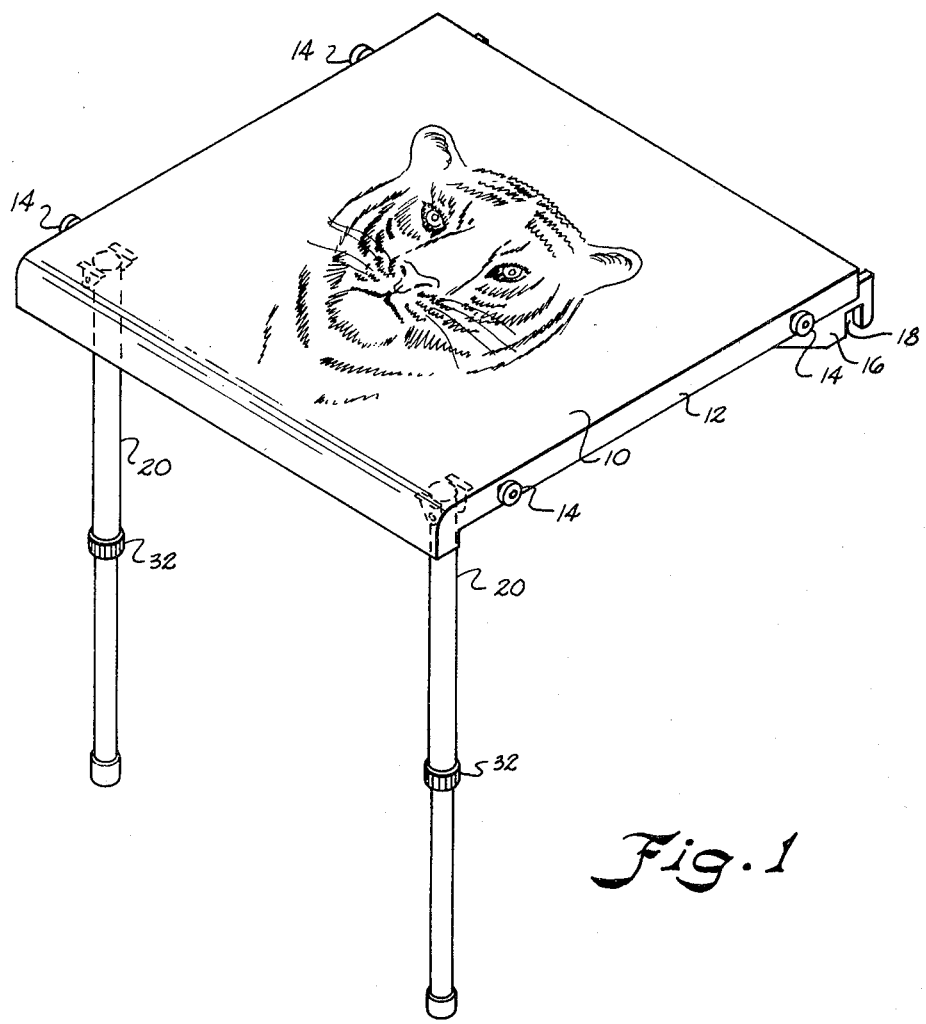
FIG. 1 is a perspective view illustrating a table forming part of the subject invention.
Figure 5:
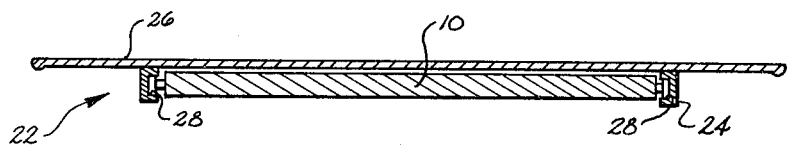
FIG. 5 is a sectional view taken along line 5—5 of FIG. 4.

Referring in more detail to the drawings, the table includes a substantially flat surface 10 that is normally square in shape which has downwardly extending sides provided thereon. Guide means 14 which in the particular embodiment illustrated are in the form of rollers are positioned adjacent the forward and rear ends of the sides of the table. These guide rollers project out beyond the edge of the table.

A pair of blocks 16 each with a recess 18 provided therein are positioned adjacent the inner end of the table. Foldable legs 20 are carried adjacent the corners of the table on the outer end thereof. The legs 20 are telescoping legs so that the length thereof can be adjusted. A pair of spaced guide tracks generally designated by the reference characters 22 and 24 are secured to the underside of the trunk lid 26 by any suitable means such as adhesive or screws. Each of the guide tracks includes a pair of channel members 28 and 30 with the opening facing each other. The channel members 28 and 30 may be constructed of any suitable material such as nylon, etc.

When it is desired to position the table within the trunk lid, the rollers 14 are merely inserted in the open ends of the channel members 28 and 30 and rolled forward. The inner ends of the channel members are closed so as to prevent the rollers running completely therethrough. The outer pair of channel members 28 provide a means for removably attaching the rear end of the table to the bottom side of the trunk lid.

When it is desired to set up the table outside of the vehicle, first the legs 20 are folded down to a vertical position and the length adjusted by means of threadable sleeves 32. The length of the legs are adjusted so that the bottom of the legs rest on the ground and the top surface of the table is on a horizontal plane with the edge 34 of the trunk. The edge of the trunk is then inserted within the recess 18 provided in the block 16. This arrangement securely holds the table relative to the vehicle and provides a sturdy support.

If it is desired to set up the table within the trunk as may possibly be the situation during inclement weather, the length of the legs 20 are shortened and the pair of guide rollers adjacent the inner portion of the table remain in the channel members 30. The guide rollers and the channel members provide a means for pivotally attaching the front end of the table to the bottom side of the trunk lid. Since the inner ends of the channel members 30 are closed, the table will remain in a horizontal position as long as the trunk lid is in the raised position such as shown in FIG. 3.

Indicia, such as a school emblem and the like, is normally printed on the upper surface of the table for making the table more attractive.

While a preferred embodiment of the invention has been described using specific terms, such description is for illustrative purposes only, and it is to be understood that changes and variations may be made without departing from the spirit or scope of the following claims.

What is claimed is:

1. A folding table and carrying support for use in an automobile having a trunk compartment with a trunk lid extending over the compartment and being connected adjacent an inner end thereof by hinges for providing access to said compartment, comprising:

means for pivotally attaching a front end of said table to the bottom side of said trunk lid with said rear end of said table terminating within the trunk of said automobile;

means for removably attaching said rear end of said table to the bottom side of said trunk lid for cooperating with said means for pivotally attaching said front end securely holding said table on the bottom of said trunk lid when transporting said table in said trunk;

a pair of telescoping legs carried in the corners of said table adjacent said rear end of said table, and means for adjusting the length of said legs so that the bottom of said legs rests on the bottom of said trunk when said front end of said table is pivotally attached to said trunk lid supporting the table in a horizontal plane with said trunk lid being raised and extending over said table and for adjusting the length of said legs to rest on the ground when said table is removed from said trunk and said front end of said table rests on the edge of said trunk compartment.

* * * * *